United States Patent
Tien

(10) Patent No.: US 7,920,130 B2
(45) Date of Patent: Apr. 5, 2011

(54) ELECTRONIC APPARATUS EQUIPPED WITH TOUCH PANEL CAPABLE OF IDENTIFYING FINGERPRINT

(75) Inventor: Kai-Wen Tien, Tainan (TW)

(73) Assignee: Quanta Computer Inc. (TW)

( * ) Notice: Subject to any disclaimer, the term of this patent is extended or adjusted under 35 U.S.C. 154(b) by 738 days.

(21) Appl. No.: 12/010,600

(22) Filed: Jan. 28, 2008

(65) Prior Publication Data

US 2009/0021487 A1   Jan. 22, 2009

(30) Foreign Application Priority Data

Jul. 18, 2007 (TW) ................. 96126081 A

(51) Int. Cl.
*G09G 5/00* (2006.01)
(52) U.S. Cl. ....................... 345/173; 382/124
(58) Field of Classification Search .......... 345/173–177; 178/18.03, 18.04, 18.09, 18.11; 382/124, 382/125, 127; 379/93.02, 93.03; 726/27, 726/28

See application file for complete search history.

(56) References Cited

U.S. PATENT DOCUMENTS

| | | | |
|---|---|---|---|
| 6,961,051 B2 * | 11/2005 | Weindorf et al. | 345/175 |
| 7,263,213 B2 * | 8/2007 | Rowe | 382/124 |
| 7,516,324 B2 * | 4/2009 | Funahashi et al. | 713/168 |
| 7,671,847 B2 * | 3/2010 | Weng | 345/173 |
| 2005/0179446 A1 * | 8/2005 | Hara et al. | 324/662 |

* cited by examiner

*Primary Examiner* — Regina Liang
*Assistant Examiner* — Tom V Sheng
(74) *Attorney, Agent, or Firm* — Thomas, Kayden, Horstemeyer & Risley, LLP.

(57) ABSTRACT

The invention discloses a touch panel capable of identifying fingerprints. The touch panel includes a touch layer and a fingerprint sensing layer. The touch layer is used for sensing a specific location touched by a finger. The fingerprint sensing layer is disposed under the touch layer and includes a storage unit, multiple receiving modules, multiple transmitting modules, and a control module. The storage unit stores a first fingerprint data corresponding to the finger. Each receiving module respectively corresponds to one of the transmission modules. According to the specific location, one of the transmission modules transmits a signal, and the signal is then reflected by the finger to the corresponding receiving module. The control module converts the signal received by the receiving module into a second fingerprint data and then determines whether the second fingerprint data conforms to the first fingerprint data.

20 Claims, 7 Drawing Sheets

| transmission module 1026 | receiving module 1020 |

ELECTRONIC APPARATUS EQUIPPED WITH TOUCH PANEL CAPABLE OF IDENTIFYING FINGERPRINT

BACKGROUND OF THE INVENTION

1. Field of the Invention

The invention relates to a touch panel, and particularly to a touch panel capable of identifying fingerprints.

2. Description of the Prior Art

Generally, an electronic apparatus needs to configure a specific password for authorized users. Only after a user inputs the correct password to pass the authorization check can the electronic apparatus be used. Recently, there are more and more electronic apparatuses utilizing fingerprint identification devices to identify users. Because any fingerprint is unique, if the fingerprint identification device records the fingerprint of the user, the user does not have to remember a specific password, and further risks of password theft and hacking can be avoided.

Additionally, touch panels are widely applied in many applications, for example, tablet PCs or ATMs of banks. If a fingerprint of a user can be directly identified by the touch panel, it is more convenient for the user. However, the touch panel at present is not capable of identifying a fingerprint.

Therefore, the invention provides a touch panel and an electronic apparatus capable of identifying fingerprints to solve the aforesaid problems.

SUMMARY OF THE INVENTION

A scope of the invention is to provide a touch panel capable of identifying fingerprints.

According to a preferred embodiment, the touch panel of the invention includes a touch layer and a fingerprint sensing layer. The touch layer is used for sensing a specific position touched by a finger. The fingerprint sensing layer is disposed under the touch layer and includes a storage unit, multiple receiving modules, multiple transmission modules, and a control module.

In the embodiment, the storage unit is used for storing a first fingerprint data corresponding to the finger. Each of the receiving modules is respectively disposed with one of the transmission modules. According to the specific position touched by the finger on the touch layer, one of the transmission modules transmits a signal, and the signal is then reflected to the corresponding receiving module. The control module is used for converting the signal received by the receiving module into a second fingerprint data, and determining whether the second fingerprint data matches the first fingerprint data stored in the storage unit.

As a whole, the fingerprint sensing layer of the invention is embedded in the touch panel, such that a user can utilize the touch panel to identify the fingerprint. Therefore, an additional fingerprint identification device does not need to be installed in an electronic apparatus. Furthermore, a volume of the electronic apparatus can be reduced, and it is more convenient for users.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
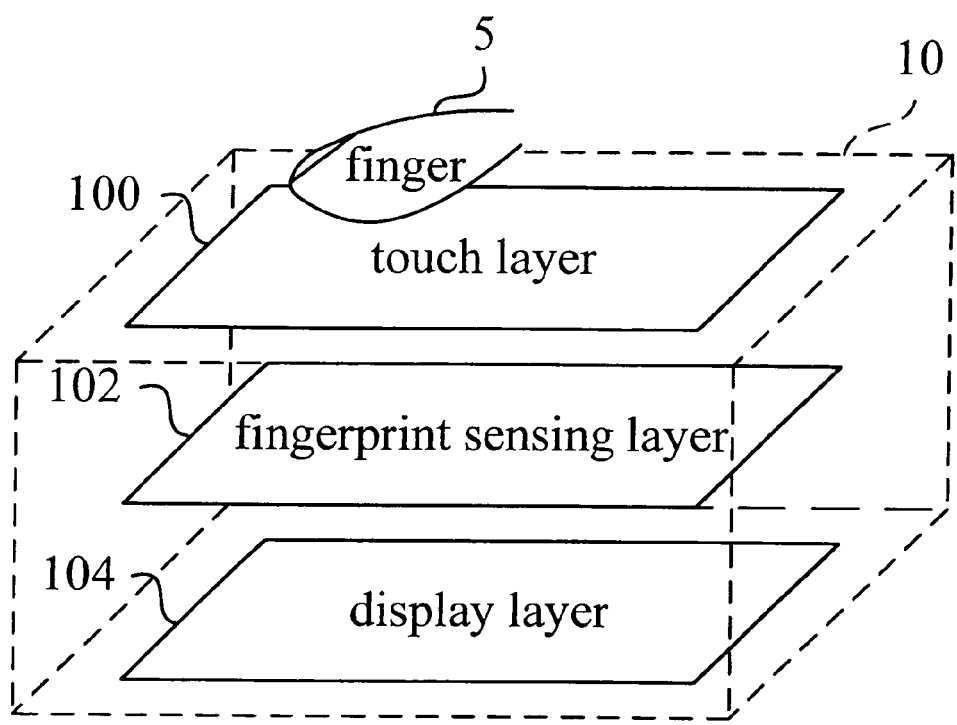
FIG. 1 is a schematic diagram illustrating a touch panel according to a preferred embodiment of the invention.
Figure 2:
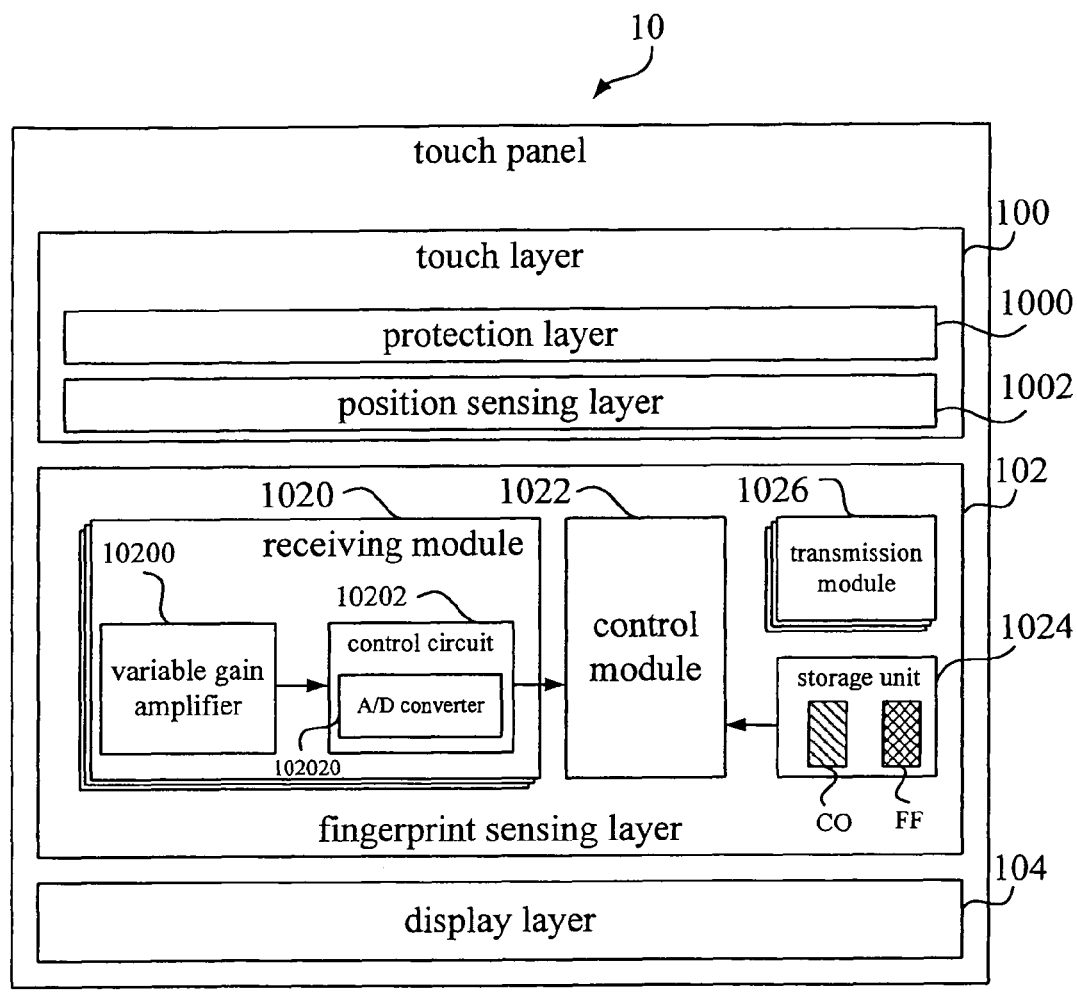
FIG. 2 is a functional block diagram of the touch panel shown in FIG. 1.

Please refer to FIG. 1 and FIG. 2. FIG. 1 is a schematic diagram illustrating a touch panel 10 according to a preferred embodiment of the invention. The touch panel 10 can also be a touch screen. FIG. 2 is a functional block diagram of the touch panel 10 shown in FIG. 1. As shown in FIG. 1, the touch panel 10 includes a touch layer 100, a fingerprint sensing layer 102, and a display layer 104. As shown in FIG. 2, the touch layer 100 includes a protection layer 1000 and a position sensing layer 1002. The fingerprint sensing layer 102 includes multiple receiving modules 1020, a control module 1022, a storage unit 1024, and multiple transmission modules 1026. The receiving module 1020 includes a variable gain amplifier (VGA) 10200 and a control circuit 10202. The control circuit 10202 is used for controlling a gain of the VGA 10200 and includes an A/D converter 102020.

In the embodiment, a specific position is touched by the finger 5 on the protection layer 1000 of the touch layer 100. The position sensing layer 1002 can be a resistance sensing layer or a capacitance sensing layer, and is disposed under the protection layer 1000. The position sensing layer 1002 is used for sensing the specific position touched by the finger 5. The protection layer 1000 is used for protecting a surface of the touch panel 10. The display layer 104 includes a liquid crystal module (LCM) (not shown). The position sensing layer 1002 can be easily applied by people skilled in the art, so the related description will not be mentioned here again.

Each of the receiving modules 1020 is respectively disposed with the corresponding one of the transmission modules 1026. The storage unit 1024 stores a corresponding data CO and a first fingerprint data FF corresponding to the finger 5. The corresponding data can be, for example, a look-up table used to indicate a transmission module 1026 and a receiving module 1020 corresponding to a touch position on the touch panel 10 (i.e. corresponding relationship between both a transmission module 1026 and a receiving module 1020 with a touch position on the touch panel 10). The VGA 10200 is used for dynamically amplifying the received signal. The A/D converter 102020 is used for converting the received signal into a digital signal.

Figure 3:
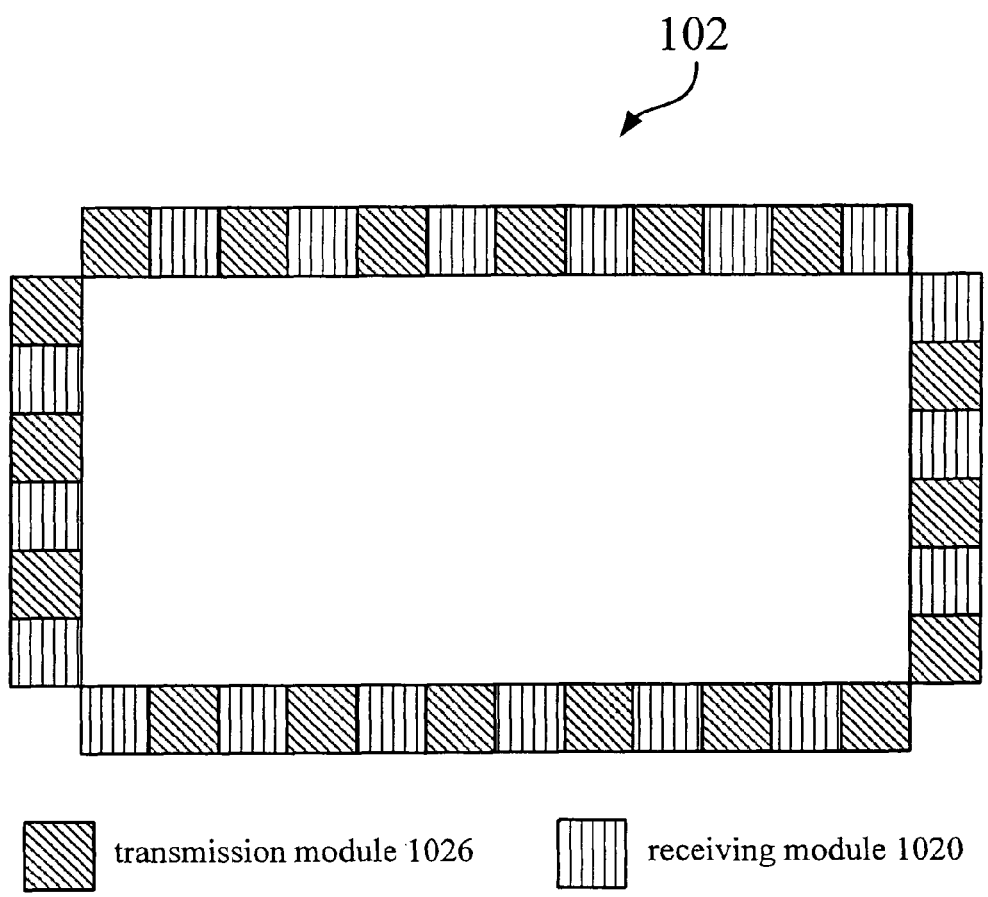
FIG. 3 is a schematic diagram illustrating a position configuration of the receiving modules and the transmission modules.
Figure 4A:
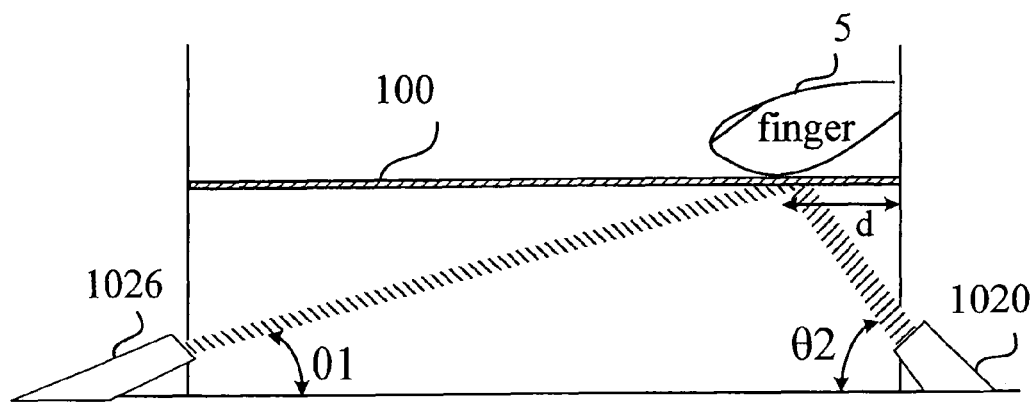
FIG. 4A is a schematic diagram illustrating a functional relation between the touch layer and the fingerprint sensing layer shown in FIG. 1.

Please refer to FIG. 3 and FIG. 4A. FIG. 3 is a schematic diagram illustrating a position configuration of the receiving modules 1020 and the transmission modules 1026. FIG. 4A is a schematic diagram illustrating a functional relation between the touch layer 100 and the fingerprint sensing layer 102 shown in FIG. 1. As shown in FIG. 3, each of the receiving modules 1020 is respectively disposed with the corresponding one of the transmission modules 1026. Additionally, each of the receiving modules 1020 and transmission modules 1026 can be rotated and is disposed on a circumference of the fingerprint sensing layer 102.

As shown in FIG. 1 and FIG. 4A, at first, the touch position touched by the finger 5 is sensed by the position sensing layer 1002 of the touch layer 100. Afterward, according to the corresponding data CO stored in the storage unit 1024, the information of the transmission module 1026 and the receiving module 1020 corresponding to the touch position is transmitted to the control module 1022. The control module 1022 then controls the transmission module 1026 to transmit a signal (e.g. a light or a supersonic wave or ultrasonic wave) to the touch position. Therefore, the transmission module 1026 can transmit a signal to the position touched by the: finger 5, and the signal is then reflected by the finger 5 to the corresponding receiving module 1020. Then, the control module 1022 converts the signal received by the receiving module 1020 into a second fingerprint data, and determines whether the second fingerprint data matches the first fingerprint data FF stored in the storage unit 1024.

It should be noticed that a quantity of the receiving modules 1020 and the transmission modules 1026 varies with practical applications. Additionally, rotation angles of the transmission module 1026 and the receiving module 1020 are not limited to the angles θ1 and θ2 along a perpendicular direction as shown in FIG. 4A, the angles (not shown) along a horizontal direction is included as well.

Figure 5A:
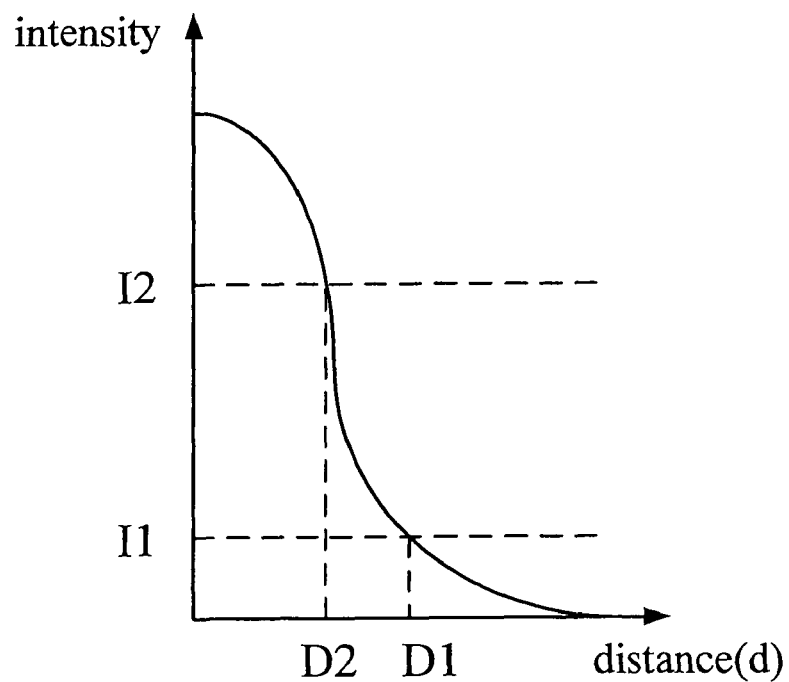
FIG. 5A is a schematic diagram illustrating intensities of signals received by the receiving module shown in FIG. 4A.

Please refer to FIG. 4A and FIG. 5A. FIG. 5A is a schematic diagram illustrating intensities of signals received by the receiving module 1020 shown in FIG. 4A. When the signal transmitted by the transmission module 1026 is a light, the intensities of the signals are shown in FIG. 5A. I2 is the minimum intensity of the signal for identification. As shown in FIG. 4A, a horizontal distance between the finger 5 and the receiving module 1020 is d. When d is equal to D2, the intensity of the received signal is I2. Alternatively, the distance between the finger 5 and the receiving module 1020 has to be smaller than D2, so the receiving module 1020 can receive a stable and better signal. Therefore, a region with edges at a distance no larger than D2 from edges of the touch panel is a better identification region. In order to enlarge the identification region with minimum intensity or better signal, the VGA 10200 (shown in FIG. 2) of the receiving module 1020 can be used for amplifying the intensity of the received signal. The minimum intensity of the signal which can be amplified by the VGA 10200 is I1. Therefore, the identification region with better signal is enlarged to a region with edges at a distance no larger than D1 from edges of the touch panel.

Figure 4B:
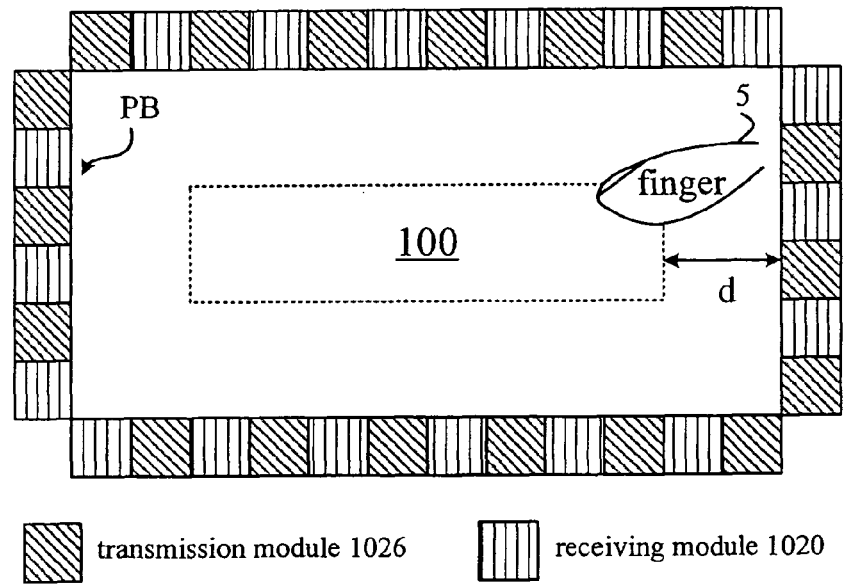
FIG. 4B is a top view of FIG. 4A.

Please refer to FIG. 5A and FIG. 4B. FIG. 4B is a top view of FIG. 4A. In the absence of the VGA 10200 (shown in FIG. 2), when a distance between the finger 5 and the receiving module 1020 (alternatively, the edge PB of the panel) is no larger than D2, a fingerprint of the finger 5 can be easily identified. If the VGA 10200 is installed in the touch panel 10 (shown in FIG. 2), when a distance between the finger 5 and the receiving module 1020 (alternatively, the edge PB of the panel) is no larger than D1, the fingerprint of the finger 5 can be easily identified, therein D1 is larger than D2.

Figure 5B:
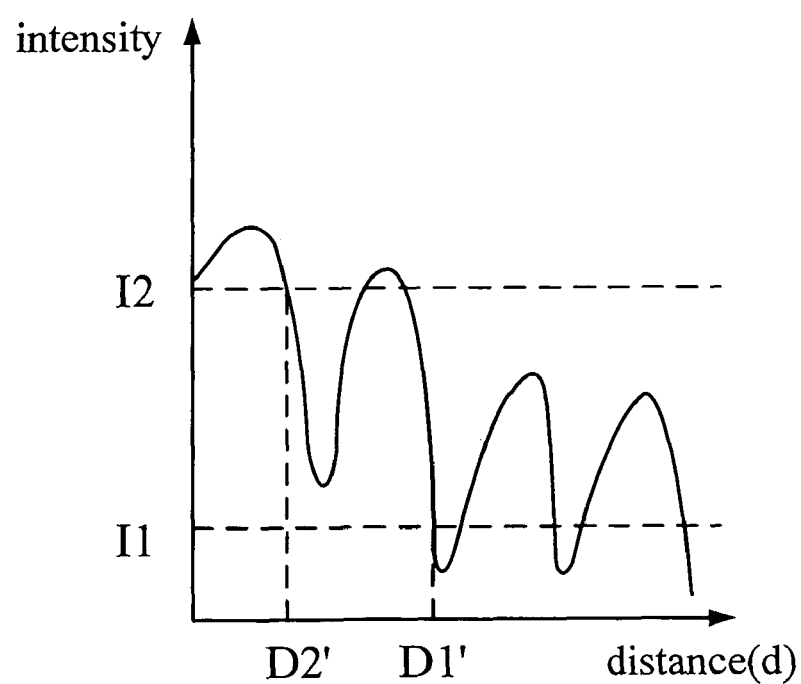
FIG. 5B is a schematic diagram illustrating intensities of signals (ultrasonic waves) received by the receiving module shown in FIG. 4A.

Please refer to FIG. 5B. FIG. 5B is a schematic diagram illustrating intensities of signals (supersonic waves or ultrasonic waves) received by the receiving module 1020 shown in FIG. 4A. When the signals transmitted by the transmission module 1026 are ultrasonic waves, the intensities of the signals are shown in FIG. 5B. Although there is more than one region with intensities of the signals larger than I2 for identification, a region with edges at a distance no larger than D2' from the edges PB (shown in FIG. 4B) is a stable and better identification region. Additionally, a stable and better identification region can be enlarged to a region with edges at a distance not larger than D1' from the edges PB (shown in FIG. 4B) by providing the VGA 10200 of the receiving module 1020.

Figure 6:
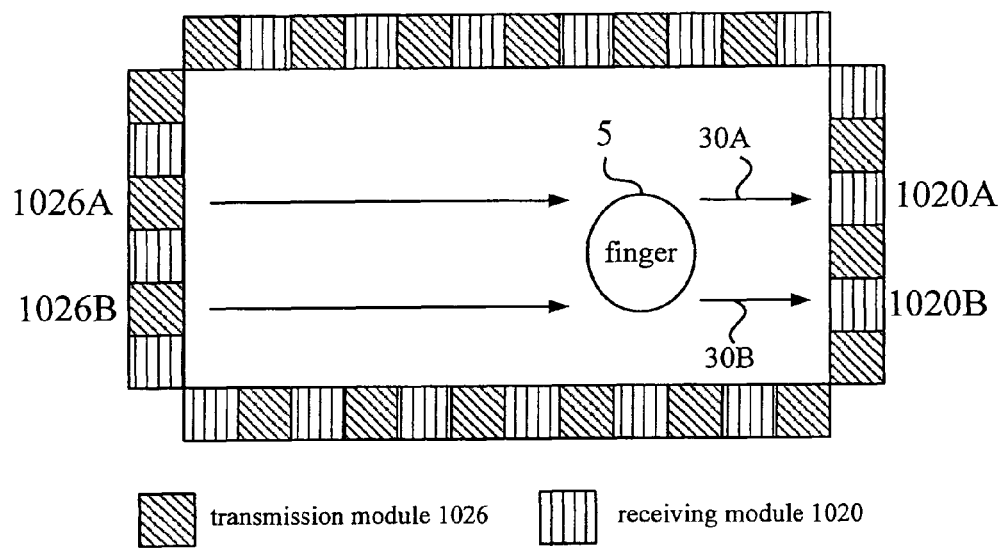
FIG. 6 is a schematic diagram illustrating two signals being transmitted and received.

Please refer to FIG. 6. FIG. 6 is a schematic diagram illustrating two signals being transmitted and received. As shown in FIG. 6, when a position is touched by the finger 5, both the transmission modules 1026A and 1026B transmit signals to the position, and the reflected signals 30A and 30B are received respectively by the corresponding receiving modules 1020A and 1020B. The control module 1022 (shown in FIG. 2) selects a signal from the reflected signals 30A and 30B with a larger intensity (the signal 30A is assumed), and the signal 30A is further converted into a second fingerprint data (not shown) and then compared with the first fingerprint data FF (shown in FIG. 2). If the result of the comparison is true, the control module 1022 does not convert the signal 30B. However, if the comparison is false, the signal 30B is converted by the control module 1022 into the second fingerprint data, and then compared with the first fingerprint data FF.

Alternatively, when two or more receiving modules 1020 receive the reflected signals, the control module 1022 will convert one of the reflected signals with a larger intensity into a second fingerprint data, and cache other signals with smaller intensities. If the result of the comparison is false, other reflected signals with smaller intensities are sequentially compared with the first fingerprint data FF.

Figure 7:
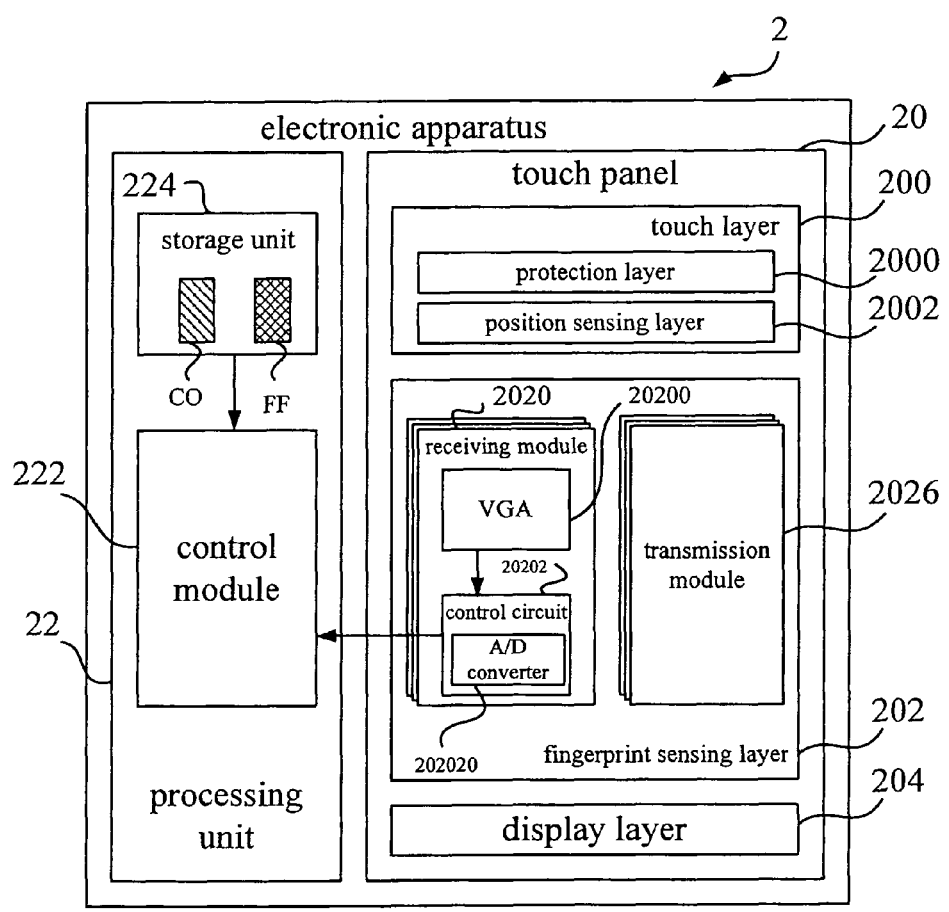
FIG. 7 is a functional block diagram of an electronic apparatus according to another preferred embodiment of the invention.

Please refer to FIG. 7. FIG. 7 is a functional block diagram of an electronic apparatus 2 according to another preferred embodiment of the invention. The electronic apparatus 2 includes a touch panel 20 and a processing unit 22. The touch panel 20 includes a touch layer 200, a fingerprint sensing layer 202, and a display 204. The touch layer 200 includes a protection layer 2000 and a position sensing layer 2002. The fingerprint sensing layer 202 includes multiple receiving modules 2020 and multiple transmission modules 2026. The receiving module 2020 includes a VGA 20200 and a control circuit 20202, and the control circuit 20202 includes an A/D converter 202020. The processing unit 22 includes a control module 222 and a storage unit 224. The storage unit 224 stores a first fingerprint data FF of the finger and the corresponding data CO.

Compared with the touch panel 10 shown in FIG. 2, the touch panel 20 of electronic apparatus 2 is only used for receiving and transmitting signals, and the comparison of the fingerprint data is processed by the control module 222 of the processing unit 22. Alternatively, the control module 222 and the storage unit 224 are included in the processing unit 22 of the electronic apparatus 2 instead of the touch panel 20.

Compared with prior art, the invention embeds the fingerprint sensing layer in the touch panel, such that a user can directly utilize the touch panel to identify a fingerprint. Therefore, additional fingerprint identification is not needed to be installed in an electronic apparatus, further a volume of the electronic apparatus is reduced, and it is more convenient for users.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A touch panel, comprising:
   a touch layer, for sensing a specific position touched by a finger; and
   a fingerprint sensing layer, disposed under the touch layer, the fingerprint sensing layer comprising:
      a storage unit, for storing a first fingerprint data corresponding to the finger;
      a plurality of receiving modules;
      a plurality of transmission modules, each of the receiving modules being respectively and correspondingly disposed with one of the transmission modules, one of the transmission modules transmitting out a signal according to the specific position, the signal being reflected to the corresponding receiving module by the finger; and
      a control module, for converting the signal received by the receiving module into a second fingerprint data, and for recognizing whether the second fingerprint data matches the first fingerprint data;
   wherein the receiving modules and the transmission modules can be rotatably disposed on a circumference of the fingerprint sensing layer.

2. The touch panel of claim 1, wherein the touch layer comprises:
   a protection layer for the finger touching thereon at the specific position; and
   a position sensing layer, disposed under the protection layer and for sensing the specific position.

3. The touch panel of claim 2, wherein the position sensing layer is a resistance sensing layer or a capacitance sensing layer.

4. The touch panel of claim 1, wherein the signal transmitted by the transmission module is a light or an ultrasonic wave.

5. The touch panel of claim 1, wherein the storage unit further comprises a corresponding data for indicating a corresponding relationship between both the transmission module and the receiving module with the specific position.

6. The touch panel of claim 1, wherein the receiving module further comprises a variable-gain amplifier (VGA) for amplifying the received signal.

7. The touch panel of claim 6, wherein the specific position touched by the finger is limited to edges of the touch panel.

8. The touch panel of claim 1, wherein the receiving module further comprises a control circuit, and the control circuit comprises an A/D converter for converting an analog signal into a digital signal.

9. The touch panel of claim 1, further comprising a display layer disposed under the fingerprint sensing layer.

10. The touch panel of claim 1, wherein each of at least two of the transmission modules respectively transmits out the signal according to the specific position, the signals are reflected to the corresponding receiving modules by the finger, and the control module selectively converts each of the signals into the second fingerprint data according to intensities of the signals.

11. An electronic apparatus, comprising:
   a touch panel, comprising:
      a touch layer, for sensing a specific position touched by a finger;
      a fingerprint sensing layer, disposed under the touch layer, the fingerprint sensing layer comprising:
         a plurality of receiving modules; and
         a plurality of transmission modules, each of the receiving modules being respectively and correspondingly disposed with one of the transmission modules, one of the transmission module transmitting out a signal according to the specific position, the signal being reflected to the corresponding receiving module by the finger; and
   a processing unit, comprising:
      a storage unit, for storing a first fingerprint data corresponding to the finger; and
      a control module, for converting the signal received by the receiving module into a second fingerprint data, and for recognizing whether the second fingerprint data matches the first fingerprint data;
   wherein the receiving modules and the transmission modules can be rotatably disposed on a circumference of the fingerprint sensing layer.

12. The electronic apparatus of claim 11, wherein the touch layer comprises:
   a protection layer, for the finger touching thereon at the specific position; and
   a position sensing layer, disposed under the protection layer and for sensing the specific position.

13. The electronic apparatus of claim 12, wherein the position sensing layer is a resistance sensing layer or a capacitance sensing layer.

14. The electronic apparatus of claim 11, wherein the signal transmitted by the transmission module is a light or an ultrasonic wave.

15. The electronic apparatus of claim 11, wherein the storage unit further comprises a corresponding data for indicating a corresponding relationship between both the transmission module and the receiving module with the specific position.

16. The electronic apparatus of claim 11, wherein the receiving module further comprises a variable-gain amplifier (VGA) for amplifying the received signal.

17. The electronic apparatus of claim 16, wherein the specific position touched by the finger is limited to edges of the touch panel.

18. The electronic apparatus of claim 11, wherein the receiving module further comprises a control circuit, and the control circuit comprises an A/D converter for converting an analog signal into a digital signal.

19. The electronic apparatus of claim 11, further comprising a display layer disposed under the fingerprint sensing layer.

20. The electronic apparatus of claim 11, wherein each of at least two of the transmission modules respectively transmits out the signal according to the specific position, the signals are reflected to the corresponding receiving modules by the finger, and the control module selectively converts each of the signals into the second fingerprint data according to intensities of the signals.

* * * * *